(12) United States Patent
Mulligan et al.

(10) Patent No.: US 8,745,073 B2
(45) Date of Patent: *Jun. 3, 2014

(54) NATIONWIDE SEND PROCESS

(75) Inventors: Martin T. Mulligan, Gloversville, NY (US); L. Edward Shaw, Dallas, TX (US); Patricia Anne Sullivan Fleming, Brea, CA (US); Thelma Yvonne Ashe, Baltimore, MD (US); Gerald M. Vye, Castleton, NY (US); Gilbert M. O'Sullivan, Charlton, NY (US)

(73) Assignee: Bank of America Corporation, Charlotte, NC (US)

( * ) Notice: Subject to any disclaimer, the term of this patent is extended or adjusted under 35 U.S.C. 154(b) by 534 days.

This patent is subject to a terminal disclaimer.

(21) Appl. No.: 12/605,895

(22) Filed: Oct. 26, 2009

(65) Prior Publication Data

US 2011/0099198 A1  Apr. 28, 2011

(51) Int. Cl.
*G06F 17/30* (2006.01)

(52) U.S. Cl.
USPC .......................................................... 707/758

(58) Field of Classification Search
USPC .......................... 707/708, 707, 710, 758, 802
See application file for complete search history.

(56) References Cited

U.S. PATENT DOCUMENTS

| | | | |
|---|---|---|---|
| 5,930,778 A * | 7/1999 | Geer | 705/45 |
| 7,275,684 B2 * | 10/2007 | McMann et al. | 235/379 |
| 2001/0037207 A1 * | 11/2001 | Dejaeger | 705/1 |
| 2004/0068464 A1 * | 4/2004 | Buchanan et al. | 705/38 |
| 2004/0133516 A1 * | 7/2004 | Buchanan et al. | 705/42 |
| 2004/0133517 A1 * | 7/2004 | Zubizarreta | 705/44 |
| 2005/0015341 A1 * | 1/2005 | Jackson | 705/45 |
| 2005/0171899 A1 * | 8/2005 | Dunn et al. | 705/39 |
| 2007/0088749 A1 * | 4/2007 | Lorch et al. | 707/104.1 |
| 2007/0094140 A1 * | 4/2007 | Riney et al. | 705/45 |
| 2007/0205262 A1 * | 9/2007 | Bates | 235/379 |
| 2008/0069481 A1 * | 3/2008 | Axtell et al. | 382/305 |
| 2008/0215957 A1 * | 9/2008 | Rapp et al. | 715/200 |
| 2008/0319880 A1 * | 12/2008 | D'Aquisto et al. | 705/30 |

FOREIGN PATENT DOCUMENTS

WO    WO 2006138450 A2 * 12/2006

* cited by examiner

*Primary Examiner* — Ajay Bhatia
*Assistant Examiner* — Fatima Mina
(74) *Attorney, Agent, or Firm* — Michael A. Springs; Moore & Van Allen PLLC; Nicholas C. Russell

(57) ABSTRACT

Methods, systems, apparatuses and/or computer program products are directed to a nationwide send process of outgoing returns. A plurality of outgoing return files are collected. The plurality of outgoing return files are organized by endpoint destination and distributed on a predetermined schedule to the endpoint destinations.

12 Claims, 8 Drawing Sheets

FIG. 8

(A) Cash Letter from State 1 Unposted for $XXX,XXX.
Breakout on the file will be the following:
XXXk to Bank 1 Image Send;
XXXk to Federal Image Exchange Cash Letter and
XXXk to Bank 2
XXXk to Bank 3
XXXK In Onus Items
$XXX.XX missing image for Bank 2

(B) Cash Letter from State 2 Posted for $XXX,XXX.
Breakout on the file will be the following:
XXXk to Bank 1 Cash Letter;
XXXk to Federal Image Exchange cash letter and
XXXK to the Bank 1 Decisioning Center (C) Cash Letter IRX for $XXX,XXX. Breakout on the file will be the following:
XXXk to Federal Image Exchange cash letter;
XXXk to Bank 3
XXXK to Bank 1
XXXK In Sister Site Items
XXX.XX Missing Item for Bank 3

800 →

| Virtual WIP Exchange Account | |
|---|---|
| $XXX,XXX (State 1 Bank 1 Entry, Bank 2 Entry, Bank 3 Entry, and the FED Entry) | $XXX,XXX from State 1 Vector 5 |
| $XXX,XXX (State 2 Bank 1 Entry, Bank 2 Entry and FED Entry) | $XXX,XXX from State 2 Vector 5 |
| $XX,XXX (IRX Bank 3) | $XX,XXX from IRX |
| $XX,XXX (IRX Bank 2 Entry) | $XXX,XXX from IRX |
| $XXX,XXXX (IRX FED Entry) | $XXX,XXX from IRX |
| $XX,XXX (IRX Sister Site to Virtual) | $XX,XXX (From IRX) |

| Wachovia Clearing Account | |
|---|---|
| | $XXX,XXX (from combined Entry) |

| Missing Image Account | |
|---|---|
| All entries will be cleared when reprocessed by missing image group | $XXX.XX from Bank 1 |
| | $XXX.XX from Bank 3 |

| Bank 1 Clearing Account | |
|---|---|
| | $XXX,XXX (from Combined Entry) |

| Bank 3 Clearing Account | |
|---|---|
| | $XXX,XXX (from Combined Entry) |

| State 1 WIP Account | |
|---|---|
| The settlement will remain as is, only change will be for image exchange partners will now charge them to new Virtual account. | |

| State 2 WIP Account | |
|---|---|
| The settlement will remain as is, only change will be for image exchange partners will now charge them to the Virtual account. | |

| IRX WIP Account | |
|---|---|
| $XX,XXX (to Virtual) | $XXX,XXX (from Virtual (Onus Items)) |
| $XXX,XXX (to Virtual) | $XX,XXX (from Virtual Sister Site) |
| $XXX,XXX (to Virtual) | |

| FED Clearing Account | |
|---|---|
| $X,XXX,XXX (Fed clears) | 1) $X,XXX,XXX (from Bank 3 Send) |

NATIONWIDE SEND PROCESS

BACKGROUND

In the marketplace, customers can pay for products or services with a personal check. However, sometimes these checks are not honored by the paying institution of the check writer ("the payor") because, for example, there are not enough funds to pay the check, a stop-payment has been placed on the check, the check is not authentic or the like. As such, the check must be processed and settled appropriately and efficiently by the paying institution via flexible systems and methods.

SUMMARY

In accordance with an embodiment of the present invention, methods, systems, apparatuses and/or computer program products are directed to a nationwide send process of outgoing returns. A plurality of outgoing return files are collected. The plurality of outgoing return files are organized by endpoint destination and distributed on a predetermined schedule to the endpoint destinations.

BRIEF DESCRIPTION OF DRAWINGS

FIG. 8 illustrates an example of a general ledger and automated settlement or clearing in accordance with some embodiments.

DETAILED DESCRIPTION

Figure 1:
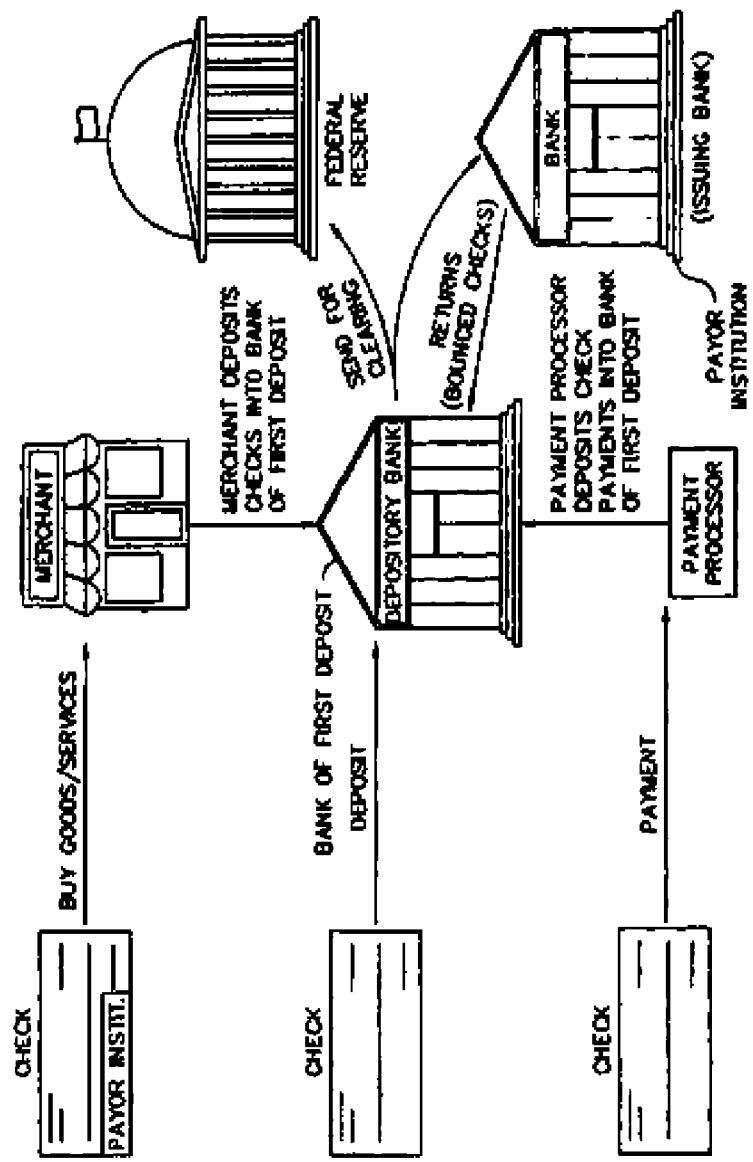
FIG. 1 illustrates an exemplary check clearing process.

Embodiments of the present invention are described below with reference to flowchart illustrations and/or block diagrams of methods and apparatuses (systems, computer program products, devices, etc.). It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create a mechanism for implementing the functions/acts specified in the flowchart and/or block diagram block or blocks.

These computer program instructions may also be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

Any combination of one or more computer-readable media/medium may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any medium that can contain, or store a program for use by or in connection with an instruction execution system, apparatus, or device.

A computer-readable signal medium may include a propagated data signal with computer program instructions embodied therein, for example, in base band or as part of a carrier wave. Such a propagated signal may take any of a variety of forms, including, but not limited to, electro-magnetic, optical, or any suitable combination thereof. A computer-readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

The computer program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention may take the form of an entirely hardware embodiment, an entirely software embodiment (including firmware, resident software, microcode, etc.) or an embodiment combining software and hardware aspects that may all generally be referred to herein as a "module," "apparatus," or "system."

The following detailed description refers to the accompanying drawings which illustrate specific embodiments of the invention. Other embodiments having different structures and operations do not depart from the scope of the present invention.

It should be understood that terms like "bank," "financial institution," and "institution" are used herein in their broadest sense. The term "financial institution" is intended to encompass all such possibilities, including but not limited to, banks, finance companies, stock brokerages, credit unions, mortgage companies, finance companies, companies, organizations which issue bills to consumers, organizations which pay bills on behalf of consumers, third party entities acting on behalf of the any of the above, etc. Additionally, disclosed embodiments may suggest or illustrate the use of agencies or contractors external to the financial institution to perform some or all of the calculations and data repository services. These illustrations are examples only, and an institution or business can implement the entire invention on their own computer systems or even a single work station if appropriate databases are present and can be accessed.

Embodiments disclosed herein are directed to check clearing and more particularly to processing of outgoing returns. Check clearing is the process of reconciling payments among parties associated with a check-based financial transaction. In some embodiments, checks are processed in the following manner: the entity to whom the check is made out ("the payee") deposits the check in her bank ("the bank of first deposit" or "the depository bank"). If the check writer's ("the payor") account is in the same bank, the check is labeled "on-us" and it is processed at the bank. Otherwise, the physical check travels, often via a financial intermediary, to the payor's institution or bank ("the paying institution"), and finally to the payor, who receives the checks and/or an account statement of the checks on a periodic basis, typically monthly. The checks that must travel (interbank transit checks) may be handled by multiple institutions.

It should be noted that the Figures disclosed herein depict paper check processing. However, there are other financial instruments, such as debit cards, electronic checks (echecks), and Automated Clearing House (ACH) debit system transactions, which are ultimately tied into the checking account of a payor institution, and thus are functionally equivalent to paper checks. For simplicity, both the prior art descriptions and the present invention collectively refer to all of these types of financial instruments as "checks."

FIG. 1 shows examples of three conventional channels of check activity for use of the customer's checks. In one channel, a customer presents a check to a merchant to buy a product or service. The merchant, in turn, deposits the check into a "bank of first deposit," also known as the "depository bank." In a second channel, a customer deposits a check directly into a bank of first deposit—the check may or may not be drawn on the bank of first deposit. In a third channel, the customer makes a payment to a payment processor. Like the merchant, the payment processor, in turn, deposits the check into a bank of first deposit. The bank of first deposit sends all checks (other than its own) to be cleared to the Federal Reserve and/or directly to the payor institution (e.g., payor bank).

If the payor does not have available funds in her account to clear the check, or if the paying financial institution does not honor the check for other reasons (e.g., the check was cancelled, etc.), the unpaid check ("a return item") travels back to the bank of first deposit. The return item is a check that is returned unpaid by the paying (payor) institution for any reason to the bank of first deposit, such as for a lack of funds. These return items are reported back to the bank of first deposit in a "returns file." Return items that flow out of the payor institution are referred to as "outgoing returns," whereas return items that are received by a bank of first deposit are referred to as "incoming returns."

Figure 2:
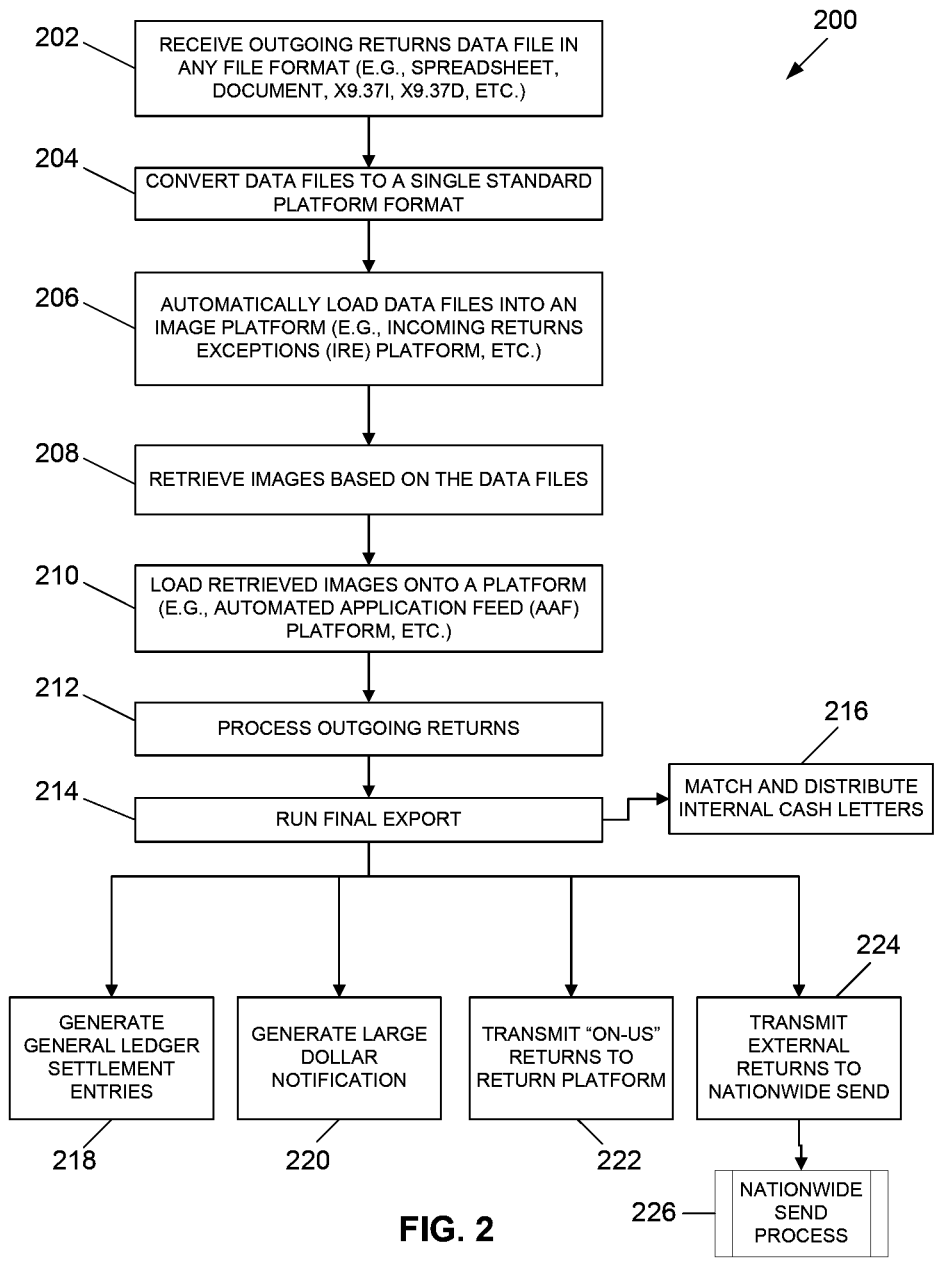
FIG. 2 is a flow chart of a method outgoing returns processing in accordance with some embodiments.

FIG. 2 illustrates a flow chart of an exemplary method 200 disclosed herein. The flow chart is divided into blocks illustrating actions or events that are undertaken by a financial institution, such as a bank, a third party, and/or any other entity. It will be understood that, unless clearly stated herein otherwise, in other embodiments the actions or events may be performed in a different order or simultaneously. Likewise, in some embodiments, one or more of the actions or events may be removed, optional, added, and/or combined with one or more other actions or events.

The method 200 disclosed in FIG. 2 may begin at block 202 where outgoing return data files are received. In one embodiment, the outgoing return data files are files that include data associated with a check or some equivalent thereof, where the check is associated with an outgoing return because the check was dishonored. The outgoing returns data files include data and/or image information about the check. In one embodiment, the data files may include image files. In other embodiments, the data files may include just check data, such as check numbers, transactional information, or any other data which allows for searchable identification of a check. The outgoing returns data files received may be in any file format, including formats which are unusable by an image platform (discussed later). For example, the data files may be a x9.37i file, a x9.37d file, a flat file, a spreadsheet, a manual entry into the system, a purely text document, or any other possible file format. The files are received through a plurality of channels, as is discussed later. Each channel relates to the path from which the data files are received from, such as from separate divisions or entities internally within a financial institution (e.g., Account Reconciliation (ARP), etc.), entities located outside of the financial institution (e.g., other banks, etc.), or any other possible means for receiving outgoing returns.

In block 204, the data files are converted to platform format. The platform format is a format that is operational and usable by the outgoing returns system (called Incoming Returns Exception ("IRE") image platform). Nonetheless, the outgoing returns data files are loaded onto a computer system and the format of these outgoing returns data files is automatically recognized by the computer system. The computer system then automatically converts the outgoing returns data files from any file format into the platform format so that the data files are usable by the IRE image platform. It should be noted that the computer system which converts the files may be part of IRE and should not be limited to a computer separate from the outgoing returns system.

After the data files are converted to the platform format, the converted outgoing returns data files are then automatically loaded onto the outgoing returns system (e.g., IRE), as illustrated in block 206. The outgoing returns system or IRE is a computer system that uses the outgoing returns data files to identify the bank of first deposit.

After the data files are loaded onto the outdoor returns server, the outgoing returns system then retrieves the images, as illustrated in block 208. In one embodiment, the outgoing returns system retrieves any images that are in the data files. In other embodiments, the outgoing returns system retrieves images from an image database or archive using data extracted from the converted data files. Such data that is extracted from the converted data files may include information such as the date that the item was processed, the amount of the check, the checking account, the payee name, the payor name, the check number, or any other information about the check or the transaction which may be helpful in searching for the image file of the check in the database or archive. For example, if an outgoing returns data file only has the amount of the check and the date the check was processed, but no other information about the check, the system can query the database for all items meeting such criteria and if only one check meets all the criteria, then the system will select that check image for processing/settlement.

After the images are retrieved, the images are then loaded onto the outgoing returns system, as shown in block 210. The images are loaded onto the outgoing returns system by any means such as transferring the images between computers, uploading the images from the database or other system, and the like.

In block 212, the outgoing returns are automatically processed. The outgoing returns are analyzed and if there's sufficient information from the image file that is loaded or the data from the converted data file, the bank of first deposit automatically identified. If there is not sufficient information to determine the bank of first deposit, the operator manually analyzes the image and/or corresponding data from the data file and determines the bank of first deposit and enters such information into the outgoing returns system. Additionally, if a large dollar notification is required, that information is also entered into the system, automatically or via the operator. Any additional information may also be entered into the system.

In block 214, a final export is run to generate cash letter information in response to identifying the bank of first deposit and/or the image files. The outgoing returns system will create outgoing cash letters that include all of the processed items, such as by matching the cash letters together as illustrated in block 216. The cash letter items will then be distributed via a nationwide send process. The nationwide send process determines which cash letter each item will be sent on.

The method 200 performs an automated settlement of the outgoing returns. For example, in block 218, general ledger settlement statement entries are generated. Further, as illustrated in block 224, any outgoing returns drawn on another bank are sent out through a nationwide send process to settle the outgoing return, such as electronically sending the outgoing return directly to the bank of first deposit or to the Federal Reserve. Any return items which are drawn "on-us" will be transmitted internally automatically to an incoming returns platform (e.g., IRX), as illustrated in block 222. The incoming returns platform (e.g., IRX) may be a platform that is separate from the outgoing returns system and processes the on-us returns separate from the outgoing returns, according to some embodiments. Additionally, a large dollar notification is generated in block 220 if any checks meet a pre-defined dollar amount threshold. The large dollar notification is provided to the bank and/or to the Federal Reserve in accordance with federal regulations.

Figure 3:
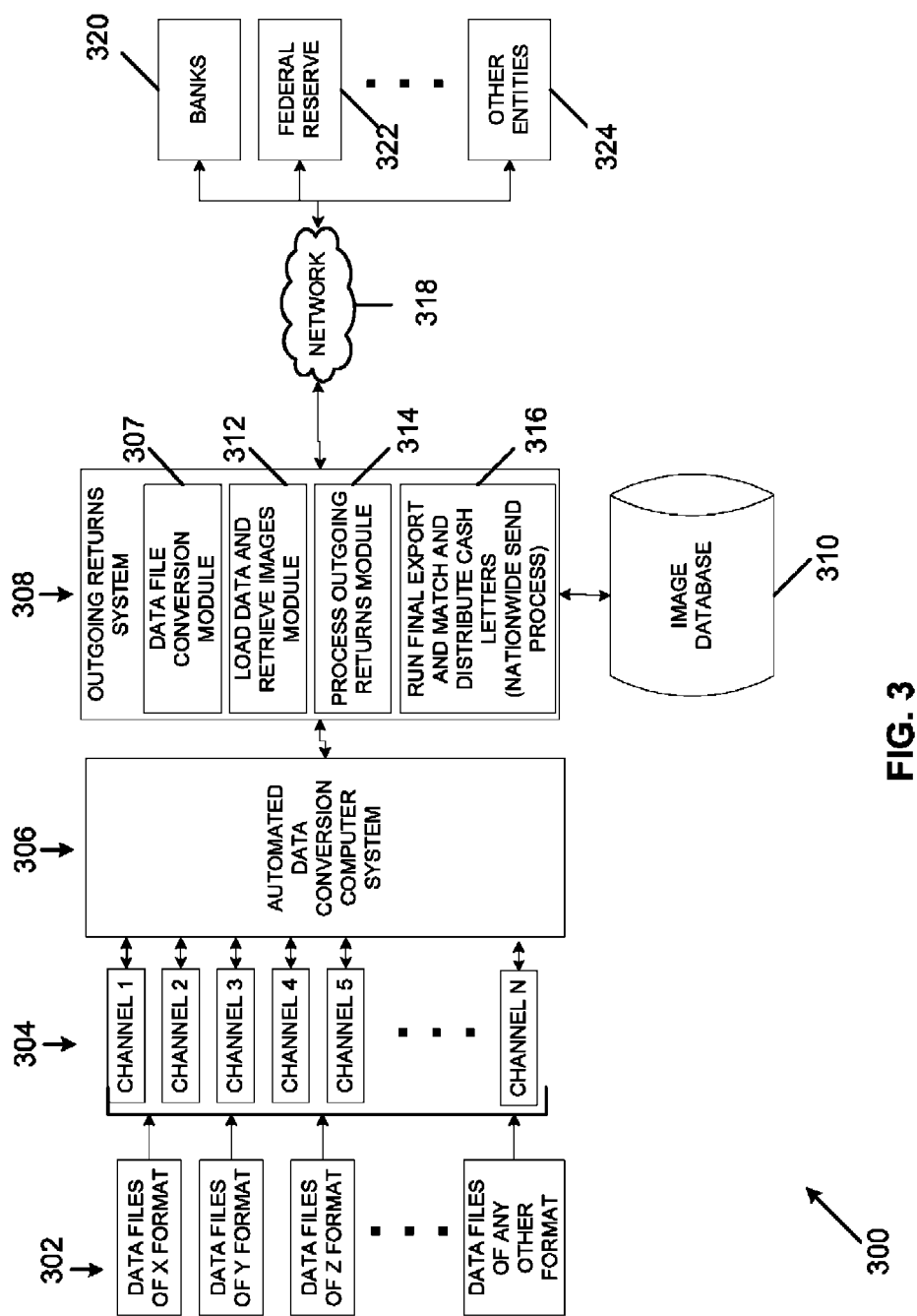
FIG. 3 is a block schematic diagram of an example system for outgoing returns processing in accordance with some embodiments.

FIG. 3 is a block schematic diagram of an exemplary system 300 for outgoing returns processing in accordance with some embodiments. As illustrated, data files 302 of any format are received via an unlimited amount of channels 304. As previously discussed, the channels 304 may be internal to the bank or channels 304 external to the bank. Nonetheless, the data files include image files and/or information to allow for archival retrieval of the image files. The data files 302 are received in an automated data conversion system 306, which may be part of the data conversion module 307 of the outgoing returns system 308 or a computer system 306 separate from the outgoing returns system 308. The automated data conversion system 306 automatically recognizes the data file format of each data file 302 and converts the data files 302 into a common platform format, as previously described. The converted data files are then processed in various modules of the outgoing returns system 308. It should be understood that the outgoing returns system 308 may be composed of a single server or a series of computers, where one or more of the modules may be operable on one or more of the computers of the system 308.

The outgoing returns system 308 may include various modules to perform functions as previously discussed. The data file conversion module 307 allows for conversion of the data files 302 to a standard platform format.

The outgoing returns system 308 may include a module to load data and retrieve images 312. The load data and retrieve images module 312 loads the outgoing returns data files onto the outgoing returns system 308 and also communicates with the image database 310. The image database 310 includes image files, and data associated with the image files, where the image files are images of checks used in transactions with the financial institution. As previously discussed, the outgoing returns system 308 may query and retrieve images files from the image database 310 based on data obtained from the outgoing returns data files 302.

The outgoing returns system 308 also includes a module for processing outgoing returns 314. The process outgoing returns module 314 processes the outgoing returns after being loaded onto the outgoing returns system 308. The process outgoing returns module 314 may optionally be a portion of the load data and retrieve images module 312.

The outgoing returns system 308 may also include a module for running final export and matching and distributing cash letters 316. Such module 316 facilitates automatic settlement of the outgoing returns and matches and distributes cash letters during such settlement process. Further, this module 316 also allows for communications over a computer network 318, such as the Internet, a private network (e.g., a intranet), or other network, to provide for communications with banks 320, the Federal Reserve 322, and other entities 324.

One or more steps of the method 200 may be performed using the system 300, and the method 200 may be continuously performed to automatically receive outgoing returns and automatically settle these returns in an inefficient manner. The method 200 and system 300 described herein allows for settlement between banks avoiding the expensive process of settlement using the Federal Reserve by obtaining the bank of first deposit information via the outgoing data files that are not in platform format. The method 200 has flexibility by allowing data files to be received in any file format possible, and through an infinite number of channels without manual human intervention to convert the data files to a format for the system 300. Additionally, the method 200 and system 300 allows for automatic settlement of the outgoing returns.

Turning now to the Nationwide Send process, which is represented as the process of block 226 of FIG. 2, which may be implemented via the computer module 316 of FIG. 3. Below is a description of some embodiments of the Nationwide sent process:

Overview

The Nationwide Send process disclosed herein collects all of the outgoing return files generated by IRX and IRE, parses out the files (e.g., cash letters) by endpoint destinations (e.g., Federal Reserve, partner banks, other destinations, etc.) and distributes these files hourly. Accordingly, the maximum number of files distributed to each endpoint is 24, which is a reduction of about 70 files per endpoint daily over previous processes. A bank may have any amount of endpoints, such as about 20 endpoints. As referred to herein, endpoints refer to destinations where the cash letters are sent to, such as partner banks, Federal Reserve or other entities. The Nationwide process allows for personalization of endpoints. As an example, each endpoint is allowed to define how many files the endpoint desires per day and at what times the endpoint wants the file. For instance, Bank A may indicate it only wants one file at the end of the day, while Bank B indicates it only wants one file at 1 pm, 3 pm, and 6 pm daily. All of this information is stored in an endpoint control card, which is discussed later.

Settlement

When the Nationwide Send process collects the return files, the process: (1) gathers the financial file totals, (2) tags each item within the files to track the application and state the source of the file, (3) makes combined credit entries to the Nationwide Send specific general ledger account by state within a sending application and (4) makes the debit entries to the endpoint specific general ledger accounts. These credit entries equal the debit entries made by the sending application. This enables a one-for-one debit to credit match within the Nationwide Send general ledger account.

Reporting:

Email and/or Viewdirect reporting is available during file collection, distribution and exception/error processing, The functionality allows for a designation of when and who is to receive the notifications and under what circumstances, whether it be when a specific source is collected into a send, a partner distribution has occurred, duplicate items have been detected and dropped, items were missing images as well as intraday reporting that provides a multi-level report of all activity that occurred for the current processing day. Intraday reporting has user/email level customizable schedules to designate the hour it is to be created and delivered. For example, a partner bank may indicate it only wants notifications once daily at 2 pm, while another bank may indicate it wants notifications sent twice a day at noon and 5 pm.

Notifications delivered via email have unique subject lines created tagging codes/notes to alert the recipient to exception type conditions such as 'out of balance', 'missing images,' duplicate items' or 'defaulted items,' individually or any combination of the conditions.

Standard end-of-day reporting also exists to show in a running balance fashion all data as it is collected and distributed from the warehouse including the source and recipient of the data and the time it occurred along with settlement reporting providing the consolidated view of our general ledger destined transactions.

Internal Controls

The Nationwide Send process may also include a duplicate file detection option with various capabilities, such as immediate development notification and automatic override/bypass. When a duplicate file is detected, any email recipient designated as a developer is sent a notification indicating a duplicate file was encountered, the input source and what date/source it was duplicated with. It is only sent to developers to prevent alarm or confusion by the masses and after research if the file is determined to be a true duplicate no action is needed but if it is required to be processed, a simple control file override is made and the file is reprocessed and general notification of the collected input is sent noting at the bottom for audit purposes a force collection occurred.

A guaranteed integrity of collected data occurs by tracking/recording items at the input source level. Prior to any processing of the data, the item counts and item amounts are totaled and through each step of the collection/distribution process all data is ensured to be accounted for. If during a collection, based on endpoint destinations the total items and/or amount does not equal the file totals when it was processed an alert is sent noting an out of balance condition has occurred and similarly during a distribution cycle if the total items on the current warehouse minus what is being released this cycle does not equal the remaining items on the warehouse, the cycle is suspended and the developer designated email recipients are notified.

End of day settlement recon occurs to ensure a file of general ledger transactions is balanced and each generated credit (collection) is applied to the generated debit (distribution), verifying only entries for data successfully collected and distributed are sent. Any unmatched entries are indicative of data pending on the warehouse and remain on our daily general ledger file until the data is released.

Item Level Edits:

Field level edits can be activated/deactivated at the partner bank level. These edits provide the ability to accommodate data recipient preferences, such as if partner-bank-A wants a given field left-justified and zero-filled but partner-bank-B prefers right-justified. The field level edits can be globally activated/deactivated.

File Level Controls:

Input (collection) file level control exists to allow tracking of all processed files for each source and each time a source triggers our process we examine all available versions to select the next unprocessed input; functionality exists to designate we want to select every Nth created file or in all cases take the most recent.

Output (distribution) file level control provides maximum flexibility and based on the physical destination of the file partner data is combined and forwarded. Additionally if a specific action needs to occur when a file is being created, the action may be customized in our control file and such customization takes place when the receiving partner has data available. Physical destination of the data is customizable at the partner level and can be electronically transmitted internally to another Lpar, externally or can remain on the creating Lpar.

Other file level controls defined at the partner level allow us to define maximum item counts per bundle to be distributed and when exceeded, the bundle is split as needed.

Duplicate Detection

The Nationwide Send process may interrogate all of the outgoing return files received to detect duplicate return items at the item level based on the various information of the outgoing returns data files, such as routing transit number, account number, serial number and amount of the check data. If a duplicate item is detected, the Nationwide Send process deletes one of the duplicate records from the distribution files and lists it on a report to have operations associates send the transaction back to the originating source.

IRD Files

Nationwide Send process expanded its capability by creating IRD print files for lines of business that receive paper cash letters and IRDs from Incoming Returns. The paper cash letters and IRDs are mailed to the unit which delays the posting to their application by at least one day. The IRDs are needed by the lines of business to process the returned transaction within their application since Incoming Returns cannot directly post transactions to those applications. The distribution of these IRD files is flexible, independent of the outgoing return file distributions and can be multiple times daily depending on the unit's needs.

Exemplary Flow Charts

Figure 4:
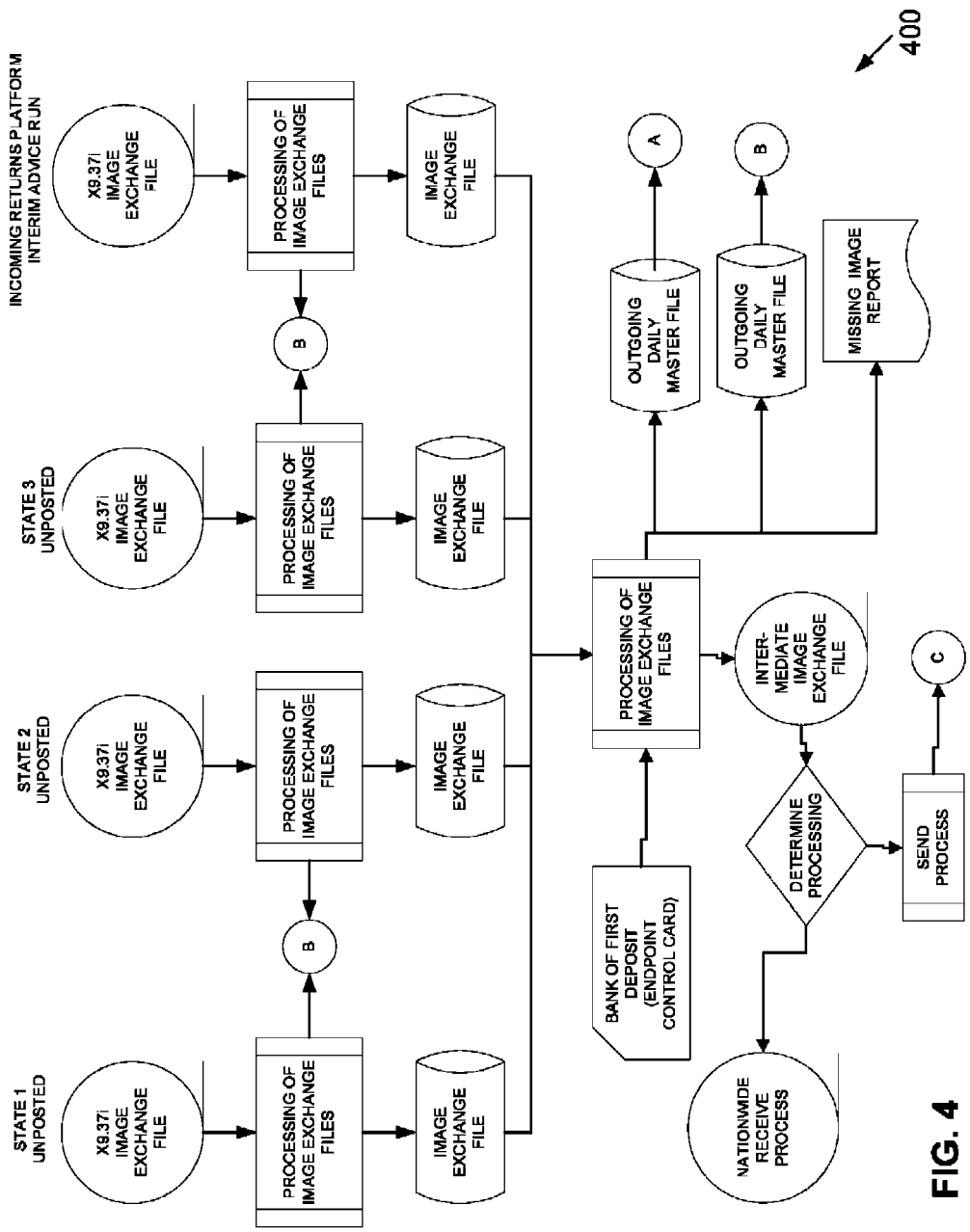
FIG. 4-7 illustrate an example of a nationwide send process in accordance with some embodiments.

FIGS. 4-8 illustrate an exemplary Nationwide Send process, which is also shown as block 226 of FIG. 2. Referring first to FIG. 4, FIG. 4 illustrates an initial file creation process 400 or a "master build" of the Nationwide Send process. As illustrated in FIG. 4, outgoing return data files (referred to into FIG. 4 as image exchange files) are received from various states and are processed. After such processing, settlement occurs as is discussed later with regard to FIG. 7. All transactions for image partners' send transactions are sent into a new Virtual Send settlement account, which will be used for all banks and IRX to settle the individual transactions to the outgoing send of transactions to the image partners. The entry for the virtual nationwide account can be a single entry for all items coming to the system. During the build of the Command and Control files (discussed in FIG. 5), information is gathered to track each cash letter being generated.

The image exchange file from each bank will be sent into the virtual sorter process and the different cash letters will be examined for what type of processing will occur for each cash letter. Any immediate files are then sent onto the VIEX at the time of initiation and are collected within VIEX to send out at the time of creation. Any image partner items are stripped off the file and a tag is built onto each record. This tag will contain the endpoint number and the file indicator. This file indicator will include items such as the bank the original file was created in, the system the file came from and the number of files that were produced that day. During the virtual sorter process, the images are interrogated to ensure that they are on each item (e.g., check). For example, if an item/check is missing a front or back image, the virtual sorter process recognizes this and flags this item. If an image is missing, the system removes the item/check from the cash letter before the cash letter is stored into the warehouse or database. The missing item is then added to a report and will be put on an interface to the settlement process.

The virtual sorter process uses a bank of first deposit control card, also known as endpoint control card. The endpoint control card has all the endpoint information for the bank, such as all of the partner banks and Federal Reserve information. Each endpoint will have a destination indicator. The indicator will direct the file to the master file or to the VIEA tax group from each file.

After processing the items in the virtual sorter process, the processed item records are then stored in an outgoing daily master file that will be used to initiate all the sends in the day to the different image partners (e.g., banks, Federal Reserve, etc.). As previously discussed, each record is tagged with an indicator for what run it is on (e.g., when the cash letter is to be sent to the endpoints or partners) and the bank of first deposit information. This tag will be used later for the creation of individual image partner files.

A missing item report will be sent to the group that currently handles missing images for the account not found in reclear process. These missing items will be processed individually.

Figure 5:
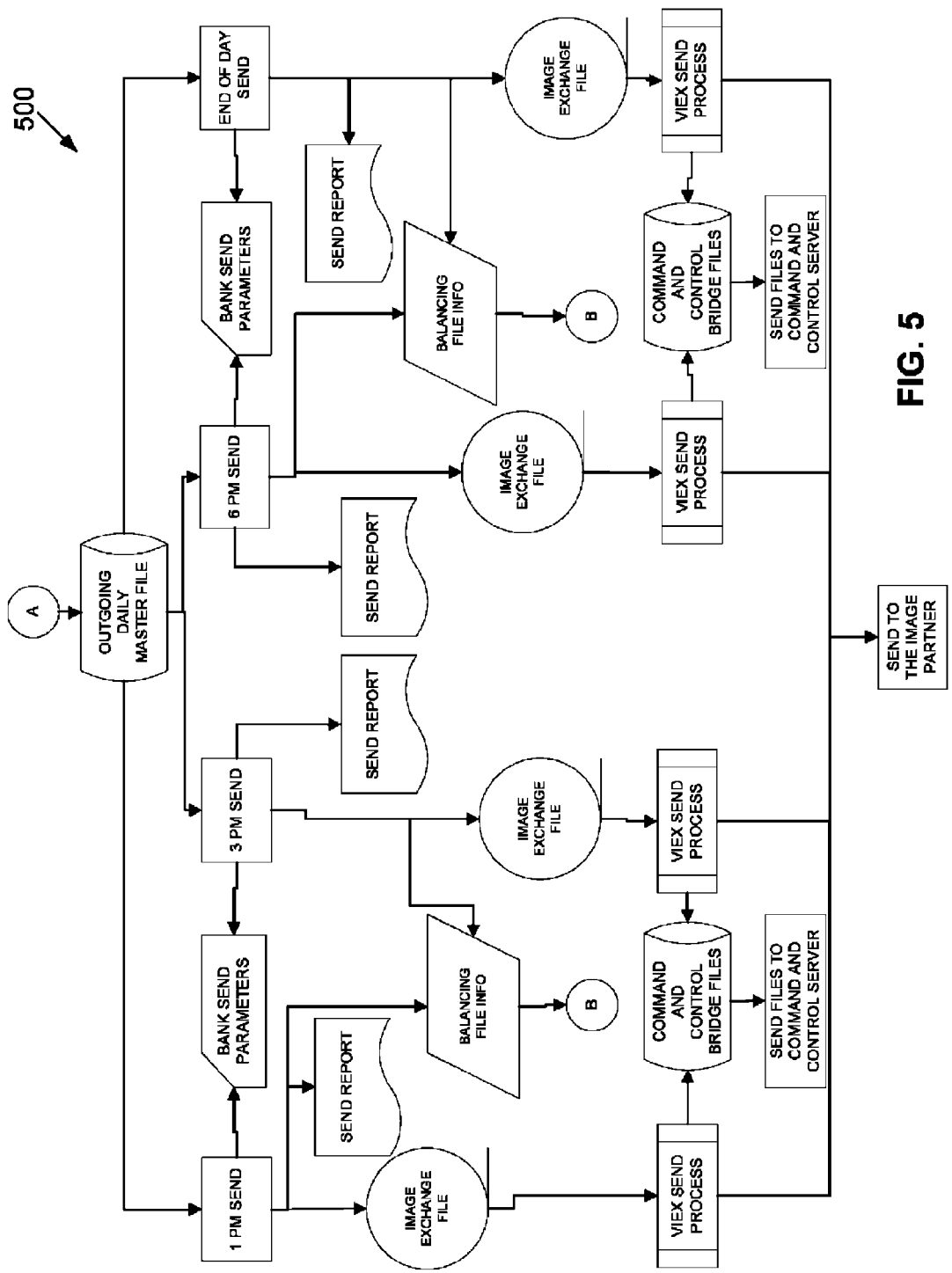

FIG. 5 illustrates a process 500 for image partner sends or individual sends which creates image partner files. This process 500 builds individual jobs for each selected time to create sends to the image partners. As referred to herein, a "send" is the process of sending a cash letter to an endpoint. The process 500 illustrated in FIG. 5 takes place in the master file and builds an X9.37i file for each send that will be performed. At this point, the item will be pulled off of the outgoing daily master file used in the bank send parameter card and the tags allow building of the settlement entries. The file will be created and sent to the VIEX group, which will send the interface file onto the image partner(s).

With the building of the cash letter, a new record is built for a balancing file for each item. This file will contain the tag that was mentioned earlier and the detail information about the individual item.

Additionally, a new report will be created in the cash letter format. The report includes the tag that identifies the file of origination, so that, in the case that there is any question or issues, it can be taken back to the original system where the item was decisioned.

It is noted that FIG. 5 illustrates an exemplary schedule (sends on 1 pm, 3 pm, 6 pm and/or end of day send), and it should be known that any other schedules could be performed or developed.

Figure 6:
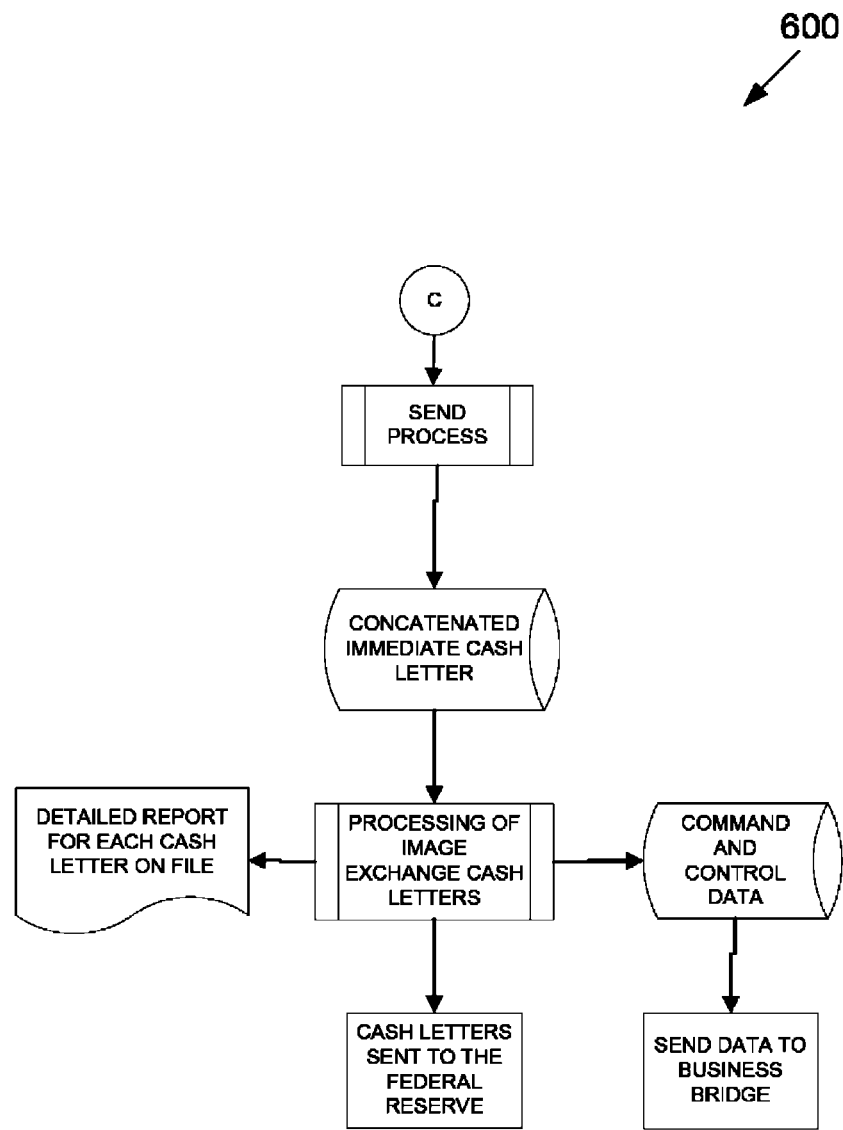

FIG. 6 illustrates an immediate send process 600. As illustrated the VIEX send process the VIEX will concatenate all the received cash letters into a single file. The image exchange cash letters are then processed and a detailed report for each cash letter is generated. Additionally command and control data is saved, and data is sent to the business bridge. Once going through the process, the concatenated cash letter is then sent to the Federal Reserve.

Figure 7:
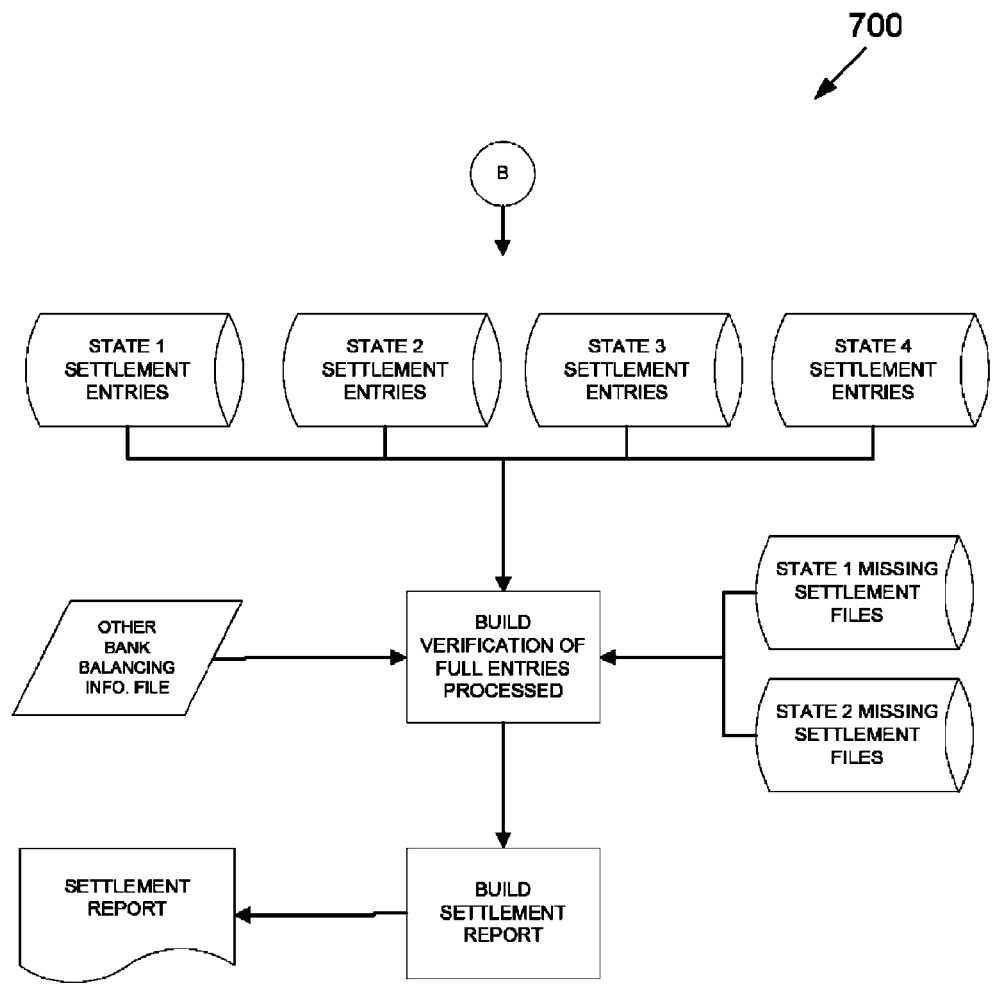

FIG. 7 illustrates the settlement process to ensure that the work for each cash letter in total and that there are issues are main and no images or cash letters missing, and determine if there's any other issues remaining. As illustrated the settlement entries from each of the states, as well as the missing images settlement files are entered into the verification block. ("Build every case in a full entries processed"). The balancing file information is determined for each send process to establish what the makeup of each file will be and the settlement entries will be written out for end of day process to complete the posting.

The individual command and control files are received into the system and the totals for each file tag indicator are determined. This will include both a count and dollar amount.

The individual bank file will be summed and totaled by the tag number for each cash letter. These totals will be compared for what was generated from the original file and the calculated send file, which should be in balance. If the original file and calculate send file is not in balance, the job will be researched to determine any discrepancies or why any items in the process are missing.

The settlement report will indicate all the different entries that make up the file being sent to the image partners. If there are any outages in the cash letter, they will be reflected in the report. If everything is in proof, a file of settlement entries for this file will be created to go into the end of day process. This will go in on the T account entries that will show the settlement process. An exemplary T account entries, as illustrated in FIG. 8.

While exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method comprising:
collecting, by a computing device processor, a plurality of outgoing return files in any file format, each outgoing return file representing a check;
determining a file format for each of the plurality of outgoing return files, wherein determining the file format for each of the plurality of outgoing return files includes automatically determining the file format based on a channel the file format was collected, wherein determining the file format further comprises reviewing image and data associated with the outgoing return files and determining that the file format is unusable for a platform for processing the outgoing return files;
converting the outgoing return files, based on the determining of the file format for each of the outgoing return files, to a predetermined image file format corresponding to a file format of the platform for processing outgoing returns image files in the predetermined image file format, wherein the converting of the outgoing return files includes loading the outgoing return files and automatically converting the file format to the predetermined image file format by a computer device processor;

organizing, by a computing device processor, the plurality of outgoing return files by endpoint destination, where the endpoint destination comprises one of a bank or Federal Reserve;

matching, by a computing device processor, the organized outgoing return files together by endpoint destination, wherein the endpoint destination is determined based at least in part on an image and data from the converted data file, wherein matching the organized outgoing return files further comprises creating an outgoing cash letter that include all of the organized outgoing return files for each of the endpoint destinations; and distributing, by a computing device processor, the plurality of outgoing return files on predetermined schedules to the endpoint destinations, wherein settlement of outgoing return files to the endpoint destination is based at least in part on one or more of;
generated general ledger settlement entries,
generated large dollar notifications,
generated on-us returns are distributed within a financial institution, and
generated external returns to send nationwide,
where the predetermined schedules are endpoint destination-dependent such that a first predetermined schedule for a first endpoint destination differs from a second predetermined schedule for a second endpoint destination.

2. The method of claim 1, wherein at least one predetermined schedule is predetermined by the endpoint destination.

3. The method of claim 1, wherein at least one predetermined schedule comprises distributing an outgoing return file to an endpoint destination hourly so that the maximum number of files distributed to each endpoint is 24 per day.

4. The method of claim 1, further comprising electronically transmitting, via a network, the outgoing returns to the endpoint destinations, wherein the endpoint destinations comprise financial institutions.

5. An nationwide send system comprising:
at least one processing device coupled to memory configured to:
collect a plurality of outgoing return files in any file format;
determine a file format for each of the plurality of outgoing return files:
wherein determining the file format for each of the plurality of outgoing return files includes automatically determining the file format based on a channel the file format was collected, wherein determining the file format further comprises reviewing image and data associated with the outgoing return files and determining that the file format is unusable for a platform for processing the outgoing return files;
convert the outgoing return files, based on the determining of the file format for each of the outgoing return files, to a predetermined image file format corresponding to the platform for processing outgoing returns image files in the predetermined image file format, wherein the converting of the outgoing return files includes loading the outgoing return files and automatically converting the file format to the predetermined image file format;
organize the plurality of outgoing return files by endpoint destinations, where the endpoint destination comprises one of a bank or Federal Reserve;
match the organized outgoing return files together by endpoint destination, wherein the endpoint destination is determined based at least in part on an image and data from the converted data file, wherein matching the organized outgoing return files further comprises creating an outgoing cash letter that include all of the organized outgoing return files for each of the endpoint destinations and wherein the plurality of outgoing return files are associated with cash letters sent to the endpoint destinations; and distribute the plurality of outgoing return files on predetermined schedules to the endpoint destinations, wherein settlement of outgoing return files settlement to the endpoint destination is based at least in part on one or more of;
generated general ledger settlement entries,
generated large dollar notifications,
generated on-us returns are distributed within a financial institution, and
generated external returns to send nationwide,
where the predetermined schedules are endpoint destination-dependent such that a first predetermined schedule for a first endpoint destination differs from a second predetermined schedule for a second endpoint destination.

6. The system of claim 5, wherein the plurality of outgoing return files represents checks issued from an issuing bank, wherein the checks are not paid by the issuing bank.

7. The system of claim 5, wherein at least one predetermined schedule comprises distributing an outgoing return file to an endpoint destination hourly so that the maximum number of files distributed to each endpoint is 24 per day.

8. The apparatus of claim 5, further comprising a network, wherein the at least one processing device is further configured to electronically transmit, via the network, the outgoing return files to the endpoint destinations, wherein the endpoint destinations comprise financial institutions.

9. A non-transitory computer readable storage medium comprising a computer program product embodied therein, the computer program product, when executed on a computer causes the computer to:
collect a plurality of outgoing return files in any file format, wherein the plurality of outgoing return files represents checks issued from an issuing bank, wherein the checks are not paid by the issuing bank;
determining a file format for each of the plurality of outgoing return files, wherein determining the file format for each of the plurality of outgoing return files includes automatically determining the file format based on a channel the file format was collected, wherein determining the file format further comprises reviewing image and data associated with the outgoing return files and determining that the file format is unusable for a platform for processing the outgoing return files;
converting the outgoing return files, based on the determining of the file format for each of the outgoing return files, to a predetermined image file format corresponding to a file format of the platform for processing outgoing returns image files in the predetermined image file format, wherein the converting of the outgoing return files includes loading the outgoing return files and automatically converting the file format to the predetermined image file format;
organize the plurality of outgoing return files by endpoint destinations, where the endpoint destination comprises one of a bank or Federal Reserve;
match the organized outgoing return files together by endpoint destination, wherein the endpoint destination is determined based at least in part on an image and data from the converted data file, wherein matching the organized outgoing return files further comprises creating an outgoing cash letter that include all of the organized outgoing return files for each of the endpoint destinations; and distribute the plurality of outgoing return files on predetermined schedules to the endpoint destinations, wherein settlement of outgoing return files to the endpoint destination is based at least in part on one or more of;

generated general ledger settlement entries, generated large dollar notifications, generated on-us returns are distributed within a financial institution, and generated external returns to send nationwide, where the predetermined schedules are endpoint destination-dependent such that a first predetermined schedule for a first endpoint destination differs from a second predetermined schedule for a second endpoint destination.

10. The computer readable storage medium of claim 9, wherein the collecting of a plurality of outgoing returns data files comprises receiving files of one of a x9.37i file format, and a x9.37d file format.

11. The computer readable storage medium of claim 9, wherein at least one predetermined schedule comprises distributing an outgoing return file to an endpoint destination hourly so that the maximum number of files distributed to each endpoint is 24 per day.

12. The computer readable storage medium of claim 9, further comprising electronically transmitting, via a network, the outgoing return files to the endpoint destinations, wherein the endpoint destinations comprise financial institutions.

* * * * *